United States Patent
Pitcel

(10) Patent No.: US 11,572,852 B2
(45) Date of Patent: Feb. 7, 2023

(54) LOW PRESSURE GASEOUS FUEL INJECTION SYSTEM

(71) Applicant: Briggs & Stratton, LLC, Wauwatosa, WI (US)

(72) Inventor: Michael Pitcel, Waukesha, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 561 days.

(21) Appl. No.: 14/594,327

(22) Filed: Jan. 12, 2015

(65) Prior Publication Data

US 2016/0201609 A1 Jul. 14, 2016

(51) Int. Cl.
*F02M 21/02* (2006.01)
*F02M 21/04* (2006.01)

(52) U.S. Cl.
CPC .......... *F02M 21/02* (2013.01); *F02M 21/047* (2013.01); *Y02T 10/30* (2013.01)

(58) Field of Classification Search
USPC ........................................................ 123/527
See application file for complete search history.

(56) References Cited

U.S. PATENT DOCUMENTS

| | | | | |
|---|---|---|---|---|
| 4,019,470 A | * | 4/1977 | Asano | F02D 41/1491 123/696 |
| 4,057,042 A | * | 11/1977 | Aono | F02D 35/0053 123/699 |
| 4,175,103 A | * | 11/1979 | Stoltman | F02D 35/0069 123/699 |
| 4,178,332 A | * | 12/1979 | Hogeman | F02D 35/0069 123/701 |
| 4,221,193 A | * | 9/1980 | Ezoe | F02D 41/123 123/483 |
| 4,462,367 A | * | 7/1984 | Tanabe | F02M 19/086 123/308 |
| 4,483,296 A | * | 11/1984 | Kataoka | F02D 41/1489 123/682 |
| 5,878,730 A | | 3/1999 | Williams | |
| 5,904,130 A | | 5/1999 | Romanelli | |
| 6,467,465 B1 | | 10/2002 | Lorts | |
| 6,883,501 B2 | | 4/2005 | Chatfield et al. | |
| 7,654,250 B2 | | 2/2010 | Fujinuma et al. | |
| 7,958,866 B2 | | 6/2011 | Thomas | |
| 2006/0064227 A1 | * | 3/2006 | Uhde | F02D 41/0027 701/104 |
| 2009/0248271 A1 | * | 10/2009 | Kuzuyama | F02D 41/006 701/103 |
| 2009/0287392 A1 | * | 11/2009 | Thomas | F02D 41/1445 701/103 |

(Continued)

FOREIGN PATENT DOCUMENTS

EP 0853189 7/1998

*Primary Examiner* — Grant Moubry
*Assistant Examiner* — Ruben Picon-Feliciano
(74) *Attorney, Agent, or Firm* — Foley & Lardner LLP

(57) ABSTRACT

An engine includes a cylinder, a piston reciprocable within the cylinder in response to the combustion of a mixture of air and fuel, and a venturi having a throat. The venturi is positioned to draw in air and direct the air and fuel to the cylinder. A fuel inlet is positioned to direct gaseous fuel into the throat, a valve is coupled to the fuel inlet, and an engine control module operable to control the valve and the fuel flow into the throat.

18 Claims, 3 Drawing Sheets

(56) References Cited

U.S. PATENT DOCUMENTS

2013/0298868 A1* 11/2013 Wittkopf ................ F02D 41/08
123/339.14
2015/0068506 A1* 3/2015 Gokhale ............... F02D 41/401
123/679

* cited by examiner

LOW PRESSURE GASEOUS FUEL INJECTION SYSTEM

BACKGROUND

Standby power systems are often used to provide back-up electrical power at commercial and residential locations in the event of loss or failure of a primary power supply. The power systems typically include a prime mover that operates using an available fuel supply to drive a generator. The generator provides limited electrical power for use at the location until the primary power supply is restored.

SUMMARY

In one construction, the invention provides an engine that includes a cylinder, a piston reciprocable within the cylinder in response to the combustion of a mixture of air and fuel, and a venturi having a throat. The venturi is positioned to draw in air and direct the air and fuel to the cylinder. A fuel inlet is positioned to direct gaseous fuel into the throat, a valve is coupled to the fuel inlet, and an engine control module operable to control the valve and the fuel flow into the throat.

In another construction, the invention provides an engine that includes a fuel supply including a low-pressure gaseous fuel, a carburetor including a venturi having an inlet, an outlet, and a throat, and a valve positioned between the fuel supply and the throat, the valve movable between an open position and a closed position to selectively inhibit the flow of fuel into the throat. An engine control unit is operable to move the valve between the open position and the closed position, and a piston movable within a cylinder to draw air from the inlet to the outlet of the carburetor, the flow of air operable to draw fuel through the valve and into the throat.

In yet another construction, the invention provides a method of operating an engine using a low pressure gas as a fuel supply. The method includes connecting a valve to a throat of a venturi, connecting a supply of low pressure gaseous fuel to the valve, and reciprocating a piston within a cylinder to produce a flow of air through the venturi, the flow of air producing a low pressure region at the throat. The method also includes selectively opening the valve to expose the supply of low pressure gaseous fuel to the low pressure region to draw fuel into the flow of air and controlling the open time of the valve to control the quantity of fuel that is mixed with the flow of air to control the operation of the engine.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
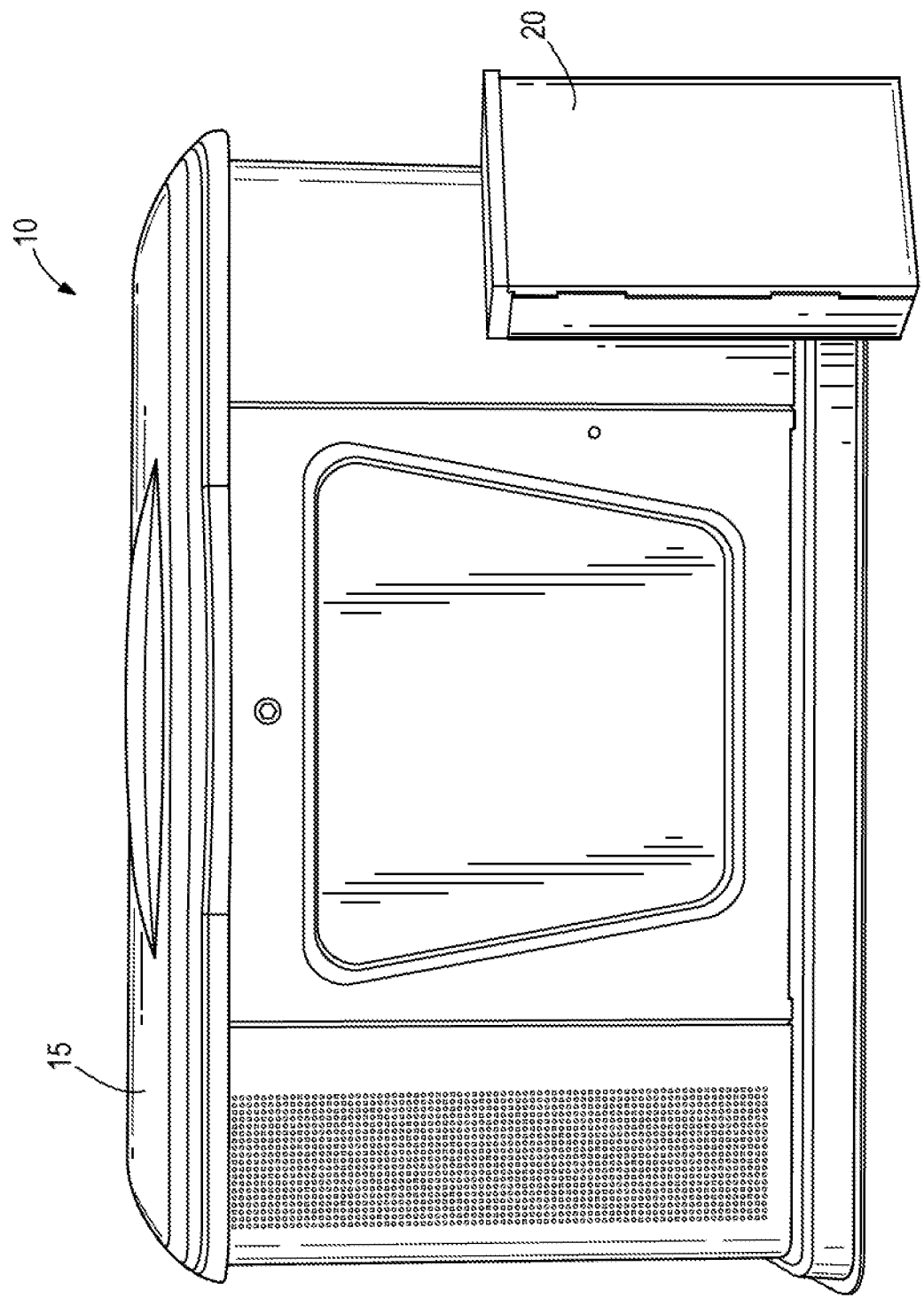
FIG. 1 is a perspective view of standby generator suitable for use in a residential application.

FIG. 1 illustrates a standby power system 10 for use in a commercial or residential application. The system 10 includes a housing 15 that contains the major components of the power system 10 and protects those components from the environment. In addition, a transfer switch 20 is typically included with the power system 10 to facilitate accurate and rapid switching between the main power source (typically the electrical grid) and the standby power system 10.

Figure 2:
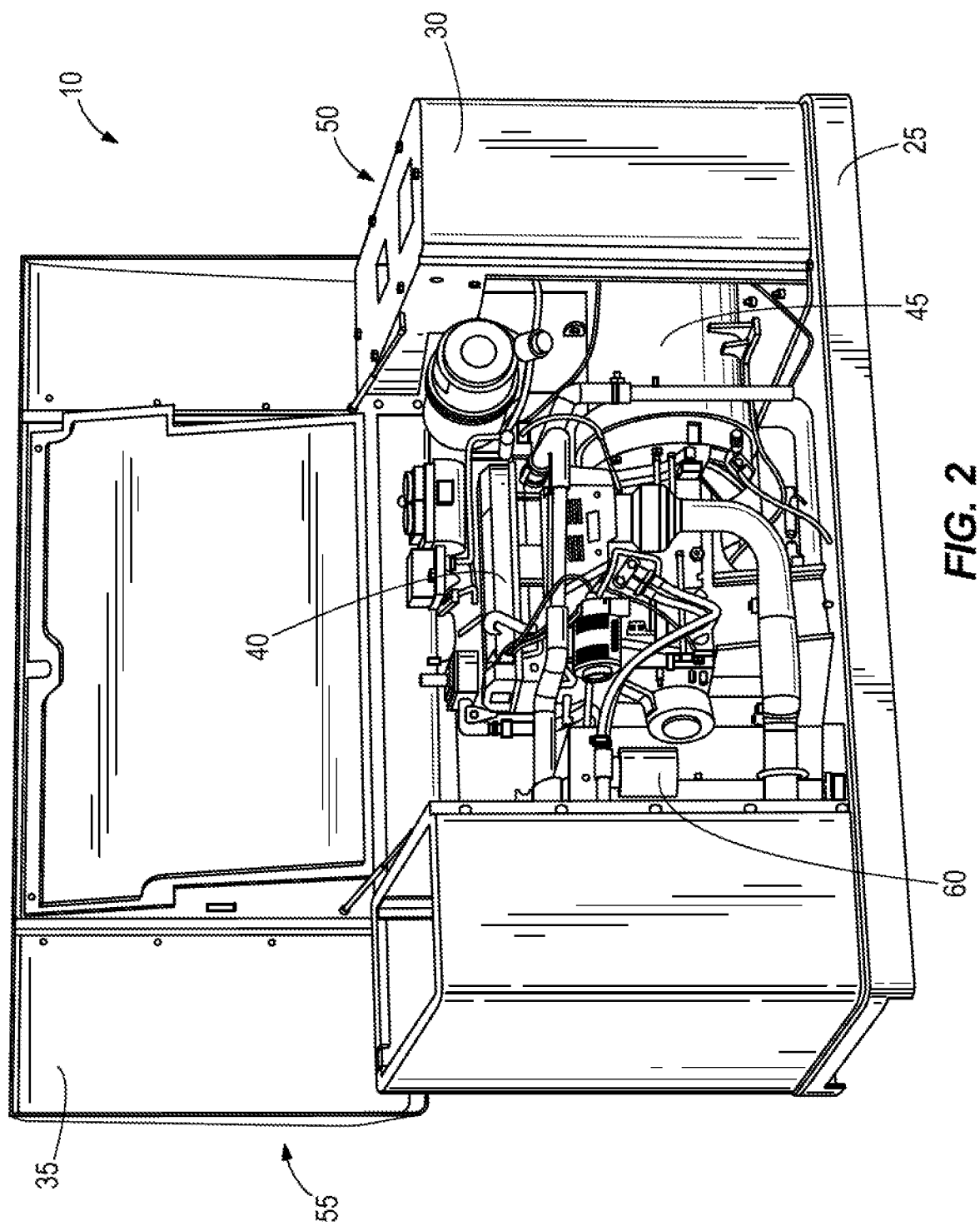
FIG. 2 is a perspective view of the interior of the standby generator of FIG. 1.

As illustrated in FIG. 2, the housing 15 includes a base 25 and an outer wall 30 that surround the internal components. A top 35 attaches to the wall 30 and is movable between a closed position (shown in FIG. 1) and an open position illustrated in FIG. 2.

With continued reference to FIG. 2, the power system 10 includes a prime mover 40 in the form of an internal combustion engine, a generator 45, an air intake system 50, an exhaust system 55 and a fuel system 60. In the illustrated construction, a two-cylinder internal combustion engine 40 operates as the prime mover. The air intake system 50 includes an intake filter 65 arranged to filter air before it is used by the engine 40. The exhaust system 55 includes any air treatment systems that may be needed to filter or clean the engine exhaust gasses and includes a muffler that reduces the noise produced by the exhaust gas as the gas exits the system 10.

Figure 3:
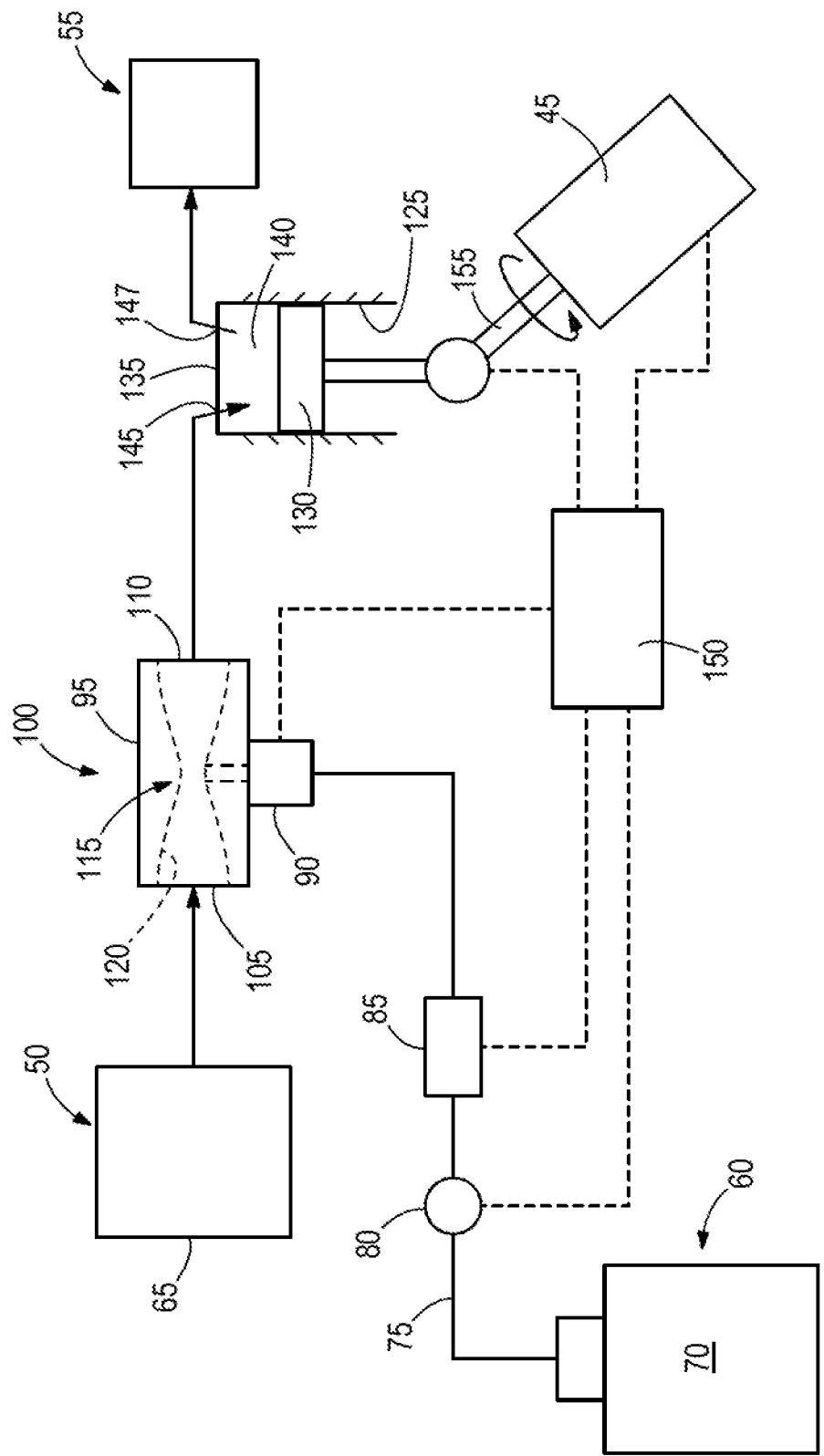
FIG. 3 is a schematic illustration of a portion of the engine.

FIG. 3 schematically illustrates the power system 10. As illustrated, a fuel is supplied to the engine 40 from a fuel supply 70 via a fuel line 75. In some constructions, propane is used as the fuel. In those constructions, the propane is stored in tanks as a liquid and gas combination but is delivered to the engine 40 in a gaseous state. In another construction, natural gas is used as the fuel for the engine 40. In these constructions, the natural gas is delivered to the home or residential site as a gas at a pressure of about 0.25 psig or 3 to 7 inches WC. A pressure sensor 80 is positioned in the fuel line 75 and is operable to measure the pressure of the fuel. A pressure regulator 85 is also positioned in the fuel line 75 and is operable to regulate and control the pressure of the fuel downstream of the regulator 85. In the illustrated construction, the pressure sensor 80 is upstream of the regulator 85. However, other constructions may position the pressure sensor 80 downstream of the regulator 85 or may include one sensor 80 on each side of the regulator 85.

A valve 90 is positioned in the fuel line 75 downstream of the pressure sensor 80 and the regulator 85. In the illustrated construction, the valve 90 is a solenoid operated two position valve. When the solenoid is activated or powered, the valve 90 moves to an open position and when power is removed or the solenoid is deactivated, the valve moves to a closed position.

The valve 90 is positioned to direct fuel into a venturi 95 that is formed as part of a carburetor or other air/fuel mixing device 100. The venturi 95 includes an inlet 105, an outlet 110, and a throat 115. A passage 120 extends from the inlet 105 to the throat 115 and converges to its smallest cross-sectional area at the throat 115. The passage 120 then continues and the cross-sectional area expands from the throat 115 to the outlet 110. The valve 90 and the fuel flow path are arranged such that fuel that passes through the valve 90 enters the venturi 95 at or near the throat 115.

With continued reference to FIG. 3, the engine 40 includes a cylinder 125 and a piston 130 that reciprocates within the cylinder 125. A cylinder head 135 is attached to the cylinder 125 and cooperates with the cylinder 125 and the piston 130 to define a variable volume combustion chamber 140. An inlet valve 145 is positioned in the cylinder head 135 and is periodically operable to admit a quantity of a fuel-air mixture. An exhaust valve 147 is also positioned within the cylinder head 135 and is operable to discharge products of combustion, or exhaust from the combustion chamber 140. It should be noted that FIG. 3 illustrates a single cylinder 125 of the engine 40 of FIGS. 1 and 2. In constructions with multiple cylinders 125 and pistons 130, multiple venturis 95 and solenoid valves 90 would be provided such that the fuel/air mixture for each cylinder 125 is controlled individually by separate valves 90. The fuel line 75 would branch to the individual solenoid valves 90 downstream of the pressure regulator 85 in preferred arrangements.

An engine control module (ECM) 50 is coupled to the solenoid valve 90 and controls the opening and closing of the valve 90. In preferred constructions, the ECM 150 is a microprocessor based device including a processing unit, a memory unit, and some form of input/output. The ECM 150 receives signals from various sensors (e.g., speed, load, temperatures, pressures, etc.) to determine the timing and duration of the opening of the solenoid valve 90. In preferred constructions, the ECM 150 uses pulse-width modulation to control the opening duration of the valve 90. The use of PWM assures accurate and precise control of the valve 90 during each engine cycle. In multi-cylinder systems, the ECU 150 controls the timing and duration of each solenoid valve 90 individually to assure the most efficient operation of the engine 40.

The piston 130 reciprocates to rotationally drive a crankshaft 155 as is well known. The generator 45 is coupled to the crankshaft 155 either directly or indirectly so that the generator 45 rotates in response to operation of the engine 40. In preferred constructions, the generator 45 is a synchronous generator that generates electricity at a frequency that is related to the rotational speed of the generator 45. For example, a two-pole synchronous generator would operate at 3600 PRM to produce electricity at the desired voltage and at a frequency of 60 Hz. A four-pole generator could be employed to produce the same desired electrical output at 1800 RPM. The engine speed is controlled by the ECM 150 or another speed-controlling device to maintain the desired speed for the generator 45. In other constructions, other generators are employed. For example, another construction uses a high frequency generator (sometimes referred to as an alternator) to produce electricity at a high frequency that varies with engine speed. The power is then conditioned, typically using a rectifier and an inverter to allow the power system to output power at the desired voltage and frequency (typically 60 Hz in the United States).

In operation, a signal is sent to the system 10 indicating that the system 10 should be started. In some cases, the signal is generated by a user. However, more often, the signal is generated in response to the system 10 detecting the loss or failure of the main power supply indicating that the back-up power supply is needed. A starter motor, or in some cases, the generator 45 is used to start rotating the engine 40. As the engine rotates, each piston 130 draws air into the air filter 65 and into the inlet 105 of the venturi 95. As the air passes through the venturi 95, the converging contour accelerates the air flow until it reaches the throat 115. The increased velocity of the air produces a corresponding drop in pressure at the throat 115. The ECM 150 signals the fuel valve 90 to open for a period of time during each rotational cycle to allow for the flow of low pressure gaseous fuel into the throat 115. The low pressure in the throat 115 increases the pressure difference between the air and the fuel supply, thereby enhancing the flow of fuel to assure that a sufficient quantity of fuel enters the venturi 95. This is particularly important during starting when a rich fuel mixture is desired. The fuel mixes with the air and this fuel/air mixture flows to the outlet 110 of the venturi 95. The fuel/air mixture then flows through the intake valve 145 and into the combustion chamber 140 for combustion. Following combustion, the products of combustion are discharged from the cylinder 125, pass through any post-combustion treating components, through the muffler, and into the atmosphere.

In some constructions or under certain operating conditions, the solenoid valve 90 could be left open for a few seconds as a prime, thereby allowing gaseous fuel to enter the venturi 95 or manifold before cranking over the engine 40. The time the valve 90 is open could be adjusted based at least partially on the pressure measured by the pressure sensor 80. The ECU 150 would increase of decrease the amount of "prime" based at least in part on the fuel pressure. Other factors such as engine temperature, atmospheric temperature, and atmospheric pressure could also be used to adjust the duration of the prime.

The arrangement illustrated in FIG. 3 includes a solenoid valve 90 that is directly connected to the venturi 95 and replaces the standard negative withdrawal pressure regulator that is typically used in conventional systems. The use of pulse width modulation with the solenoid valve 90, allows the system ECU 150 to control the fuel more precisely to each individual cylinder 125. In prior art systems, the negative withdrawal pressure regulator did not allow gaseous fuel to flow until the venturi pressure dropped during the intake valve opening period. The solenoid valve 90 allows the flow of gaseous fuel to be started earlier or delayed based on the load/speed conditions.

The pressure sensor 80 can be placed between the solenoid valves 90 and the pressure regulator 85. The sensor 80 is used to measure the pressure and this pressure value is used to adjust the solenoid valve operation based on the fuel pressure supply.

In some constructions, a fuel map is provided to and stored in the ECU 150. The fuel map identifies the quantity of fuel needed (and therefore the time the solenoid valve 90 is open) based on engine load and speed. The measured fuel pressure value can be compared to the expected fuel pressure value and that difference can be used to trim the fuel map and enhance the operation of the engine 40. For example, one operating location may receive natural gas at 3" WC while another location receives natural gas at 12" WC. The pressure sensor 80 allows one fuel map to accommodate both situations and is adjusted based on the actual pressure of the fuel. In addition, in some constructions the measured pressure is used to distinguish between natural gas and LPG. The engine control module 150 can than very the engine operation (e.g., fuel map, PWm timing, spark timing of the engine, etc.) based on the type of fuel being consumed. This allows the same unit to be installed into different regions without having to adjust the fuel map or the operation of the ECU 150.

Various features and advantages of the invention are set forth in the following claims.

What is claimed is:

1. An engine comprising:
   a cylinder;
   a piston reciprocable within the cylinder in response to the combustion of a mixture of air and fuel, each reciprocation defining an engine cycle;
   a venturi having a throat, the venturi positioned to draw in air and direct the air and fuel to the cylinder;
   a fuel inlet positioned to direct gaseous fuel into the throat;
   a pressure sensor positioned upstream the venturi to detect a fuel pressure of the fuel;
   a solenoid-operated two position valve coupled to the fuel inlet and positioned to control a quantity of fuel available at the fuel inlet, the solenoid-operated two position valve movable between an open position and a closed position, wherein in the open position, the solenoid-operated two position valve directs fuel from a fuel supply to the throat of the venturi only through a single passage from the fuel supply to the throat of the venturi; and
   an engine controller structured to control the solenoid-operated two position valve and the fuel flow into the throat, wherein all of the air directed to the engine passes through the venturi, wherein pulse width modulation is used to directly control the opening duration of the solenoid-operated two position valve during each engine cycle based on a fuel type being supplied to the venturi, and wherein the engine controller determines the fuel type being supplied to the venturi using the fuel pressure detected by the pressure sensor.

2. The engine of claim 1, wherein the venturi includes an inlet and an outlet, and the throat is positioned between the inlet and the outlet, and wherein the reciprocation of the piston draws air from the inlet, past the throat, and out the outlet.

3. The engine of claim 2, wherein the gaseous fuel is delivered to the fuel inlet at a first pressure, and wherein the flow of air past the throat produces a second pressure at the throat, the second pressure being lower than the first pressure.

4. The engine of claim 3, wherein the fuel is gaseous natural gas and the first pressure is less than 7 inches of water.

5. The engine of claim 1, wherein the engine controller controls the quantity of fuel flowing into the throat.

6. The engine of claim 5, wherein the engine includes a sensor operable to measure an engine parameter, and wherein the engine controller opens the solenoid-operated two position valve for a predetermined period of time prior to starting the engine to prime the engine, wherein the predetermined period of time is based at least partially on the measured engine parameter.

7. The engine of claim 6, wherein the engine parameter is selected from the group of an engine oil temperature, an engine temperature and an ambient temperature.

8. The engine of claim 1, wherein the venturi is part of a multi-barrel carburetor and wherein each barrel includes a separate venturi and a separate solenoid-operated two position valve.

9. An engine comprising:
   a fuel supply including a low-pressure gaseous fuel;
   a carburetor including a venturi having an inlet, an outlet, and a throat;
   a solenoid-operated two position valve positioned between the fuel supply and the throat, the solenoid-operated two position valve movable to an open position to direct fuel from the fuel supply to the throat only through a single passage from the fuel supply to the throat of the venturi;
   a pressure sensor positioned upstream the venturi to detect a fuel pressure of the fuel;
   an engine controller configured to move the solenoid-operated two position valve between the open position and a closed position, wherein pulse width modulation is used to directly control the opening duration of the solenoid-operated two position valve during an engine cycle based on a fuel type being supplied to the venturi, the engine controller determining the fuel type being supplied to the venturi using the fuel pressure detected by the pressure sensor; and
   a piston movable within a cylinder to define the engine cycle and to draw air from the inlet to the outlet of the carburetor, the flow of air operable to draw fuel through the solenoid-operated two position valve and into the throat, wherein the fuel supply includes a supply of one of natural gas and liquid propane that is directly connected to the engine to provide a flow of fuel to the solenoid-operated two position valve.

10. The engine of claim 9, wherein the gaseous fuel is delivered to the solenoid-operated two position valve at a first pressure, and wherein the flow of air past the throat produces a second pressure at the throat, the second pressure being lower than the first pressure.

11. The engine of claim 10, wherein the fuel is gaseous natural gas and the first pressure is less than 7 inches of water.

12. The engine of claim 9, wherein the engine controller controls the quantity of fuel flowing into the throat.

13. The engine of claim 12, wherein the engine includes a sensor operable to measure an engine parameter, and wherein the engine controller opens the solenoid-operated two position valve for a predetermined period of time prior to starting the engine to prime the engine, wherein the predetermined period of time is based at least partially on the measured engine parameter.

14. The engine of claim 13, wherein the engine parameter is selected from the group of an engine oil temperature, an engine temperature and an ambient temperature.

15. A method of operating an engine using a low pressure gas as a fuel supply, the method comprising:
   connecting a solenoid-operated two position valve to a throat of a venturi;
   connecting a supply of low pressure gaseous fuel to the solenoid-operated two position valve;
   detecting a fuel pressure of the low pressure gaseous fuel;
   operating the solenoid-operated two position valve to control the quantity of fuel available at the venturi;
   reciprocating a piston within a cylinder to define an engine cycle and to produce a flow of air through the venturi in which all of the air flowing to the cylinder passes through the venturi, the flow of air producing a low pressure region at the throat;
   selectively opening the solenoid-operated two position valve to expose the supply of low pressure gaseous fuel to the low pressure region to draw fuel from a fuel supply only through a single passage from the fuel supply to the throat of the venturi into the flow of air at the throat of the venturi; and controlling the open time of the solenoid-operated two position valve during each engine cycle to control the quantity of fuel that is available to be mixed with the flow of air to control the operation of the engine based on a fuel type being supplied to the venturi, the fuel type being determined using the detected fuel pressure.

16. The method of claim 15, further comprising pulsing the solenoid-operated two position valve periodically to control the time the solenoid-operated two position valve is open to regulate the flow of fuel to the throat.

17. The method of claim 15, further comprising sensing a temperature selected from the group of an engine oil temperature, an engine temperature and an ambient temperature, and calculating a predetermined priming period for starting the engine, wherein the predetermined priming period is based at least partially on the measured temperature.

18. The method of claim 15, further comprising measuring a fuel pressure upstream of the solenoid-operated two position valve and varying the open time of the solenoid-operated two position valve in response to variations in the measured pressure.

* * * * *